United States Patent [19]

Sato

[11] 4,170,915
[45] Oct. 16, 1979

[54] FEED CONTROL FOR HORIZONTAL BANDSAW MACHINES

[75] Inventor: Masao Sato, Hadano, Japan

[73] Assignee: Amada Company, Limited, Isehara, Japan

[21] Appl. No.: 882,118

[22] Filed: Feb. 28, 1978

[30] Foreign Application Priority Data

Feb. 28, 1977 [JP] Japan ................................. 52/20165

[51] Int. Cl.² ............................................. B26D 5/04
[52] U.S. Cl. ......................................... 83/800; 83/72; 83/13; 83/76
[58] Field of Search ........................ 83/800, 72, 13, 76

[56] References Cited

U.S. PATENT DOCUMENTS

| 2,602,987 | 7/1952 | Wells ..................................... 83/800 |
| 2,649,646 | 8/1953 | Remmen ................................. 83/72 |
| 4,016,787 | 4/1977 | Sugimoto ................................ 83/13 |

FOREIGN PATENT DOCUMENTS 361070 1/1973 U.S.S.R. ....................................... 83/76

Primary Examiner—Donald R. Schran
Attorney, Agent, or Firm—Thompson, Birch, Gauthier & Samuels

[57] ABSTRACT

In a horizontal bandsaw machine of the type having a base with a worktable for supporting a material, and a cutting head assembly carrying a cutting blade which is operable at varying speeds and which is arranged to perform a cutting operation on the material, the cutting head assembly being movable in one direction away from the material by a fluid-actuated mechanism fed by a pump from a fluid reservoir, and being movable in the opposite direction by means of gravity when feeding the cutting blade into the material, a control system for controlling the movement of the cutting head assembly in the aforesaid opposite direction, comprising a plurality of control valves and associated conduits for returning hydraulic fluid from the fluid actuated mechanism to the reservoir during movement of the cutting assembly in its opposite direction, the control valves being responsive in part to changes in the operating speed of the cutting blade.

6 Claims, 2 Drawing Figures

FEED CONTROL FOR HORIZONTAL BANDSAW MACHINES

BACKGROUND OF THE INVENTION

1. Field of the Invention

The present invention relates generally to a horizontal bandsaw machine in which a cutting head assembly carrying a bandsaw blade is lowered during a cutting operation in order to feed the blade into an underlying material, and more particularly pertains to a feed control for controlling the movement of the cutting head assembly during a cutting operation.

2. Description of the Prior Art

Conventionally, a horizontal bandsaw machine is provided with a cutting head assembly carrying a bandsaw blade. The cutting head assembly is lowered toward the material during the cutting operation so as to feed the bandsaw blade into the material. The bandsaw blade is endless and is trained around two wheels in the cutting head assembly, one of the wheels being driven. The cutting head assembly is usually raised by some known means, for example a piston-cylinder unit, and is lowered by gravity as hydraulic fluid is discharged from the cylinder.

In such horizontal bandsaw machines, the feeding force acting on the blade has to be great enough to cut hard and tough "difficult" materials. Insufficient feeding force will cause the bandsaw blade to slide over the difficult materials, without actually cutting, and as a result the blade will not only be worn uselessly, but also it will produce an undesirable work hardening of the material. For this reason, the cutting head assembly is usually so designed as to be heavy enough to exert the force required on the cutting blade to cut difficult materials.

Also, for economical and efficient cutting operations with horizontal bandsaw machines, it is of course desirable to run the blade at the highest speeds possible. Accordingly, the bandsaw blade is driven at a higher speed when cutting "normal" easy-to-cut materials which are generally soft and brittle. However, excessive speed of the bandsaw blade in cutting difficult materials will cause the bandsaw blade to simply slide over the material again with the result that the blade is worn uselessly while the material undergoes undesirable work hardening.

One of the most serious disadvantages of horizontal bandsaw machines has been that the feeding force needed to cut the difficult materials is too great to economically and efficiently cut normal materials. Excessive feeding force will force the bandsaw blade to cut into the normal materials too rapidly which in turn will produce excessive blade wear.

For the above reasons, it is on one hand desirable when cutting normal materials to run the bandsaw blade at a higher speed and to feed the same into the material so that the cutting action may be performed always at a certain optimum cutting rate which is defined as square millimeters of cut per unit of time. On the other hand, however, it is desirable when cutting difficult materials to feed the bandsaw blade into the material with a greater feeding force and at a lower operating speed. Accordingly, it is also desired in horizontal bandsaw machines to steplessly or gradually control the feeding of the bandsaw blade with an optimum travelling speed thereof according to the materials to be cut.

SUMMARY OF THE INVENTION

It is a general object of the present invention to provide a feed control for horizontal bandsaw machines which will feed the bandsaw blade at a certain optimum cutting rate and at a higher operating speed when cutting normal materials and also feed the same with a greater feeding force and at a lower speed when cutting difficult materials.

It is another object of the present invention to provide a feed control for horizontal bandsaw machines which is capable of steplessly or gradually controlling the feeding of the bandsaw blade with an optimum travelling speed thereof according to the type of materials to be cut.

It is still another object of the present invention to provide a feed control for horizontal bandsaw machines which can be most easily manipulated to obtain the optimum feeding of the bandsaw blade into the material being cut.

Basically, these objects are accomplished by providing a horizontal bandsaw machine with a rotary valve means which allows the hydraulic fluid to discharge from the hydraulic cylinder for raising the cutting head assembly with the rotation of the bandsaw blade and a pressure control valve means and a flow control valve means which control the pressure and the flow, respectively, of the hydraulic fluid exhausting from the hydraulic cylinder. Thus, in order to control the feeding of the bandsaw blade, the hydraulic fluid discharging from the hydraulic cylinder to feed the bandsaw blade is controlled mainly by pressure by the pressure control valve means in cutting easy-to-cut materials, while it is controlled mainly by flow by the flow control valve means in cutting difficult-to-cut materials.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENT

Figure 1:
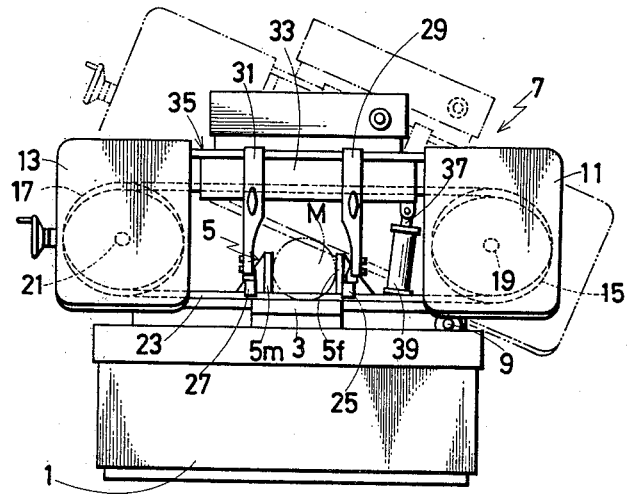
FIG. 1 is a front elevational view of a horizontal bandsaw machine equipped with a feed control embodying the concepts of the present invention.

Referring now to FIG. 1, there is shown a horizontal bandsaw machine which comprises a box-like base 1 on which a worktable 3 and a vise assembly 5 having a fixed jaw 5f and a movable jaw 5m are mounted for holding the material M to be cut. An inverted U-shaped cutting head assembly 7 is pivotally mounted on the base 1 by means of a hinge shaft 9. The cutting head assembly 7 has a pair of housing sections 11 and 13 at its opposite ends which enclose respectively a driving wheel 15 and a driven wheel 17, having shafts 19 and 21. An endless bandsaw blade 23 is trained around the driving and driven wheels 15 and 17. The bandsaw blade 23 is guided and held by guides 25 and 27 with its cutting edge facing downward in the cutting area located between the guides. The guides 25 and 27 are fixed to the lower ends of supporting arms 29 and 31, respectively, which are dependent from and adjustably movable along a guide bar 33 fixed to a beam 35 which extends longitudinally between the housing sections 11, 13.

The cutting head assembly 7 is so designed as to be raised and lowered or swung up and down around the hinge shaft 9 by a piston rod 37 of a hydraulic motor or cylinder 39 which is pivotally supported on the base 1. As will be described hereinafter in greater detail, the cutting head assembly 7 is raised by the piston rod 37 when hydraulic cylinder 39 is supplied with the hydraulic fluid, and it is lowered when hydraulic fluid is discharged from the hydraulic cylinder 39. Thus, in cutting operations, the cutting head assembly 7 is initially raised and is then lowered toward the material M. During the downward stroke, the bandsaw blade 23, which is travelling around the driving and driven wheels 15 and 17, is fed into the material M to cut the same.

The bandsaw blade 23 is operated at a higher speed for the economical and efficient cutting of normal soft and brittle materials which are easy to cut. By the same token, the bandsaw blade is operated at a lower speed when cutting difficult materials. The easier or more "normal" the material M is to cut, the higher the travelling speed of the bandsaw blade is, and the more "difficult" or harder the material M is to cut, the lower the speed is.

In reference to FIG. 1, it is to be noted that the present invention is applicable to any suitable known type of horizontal bandsaw machine, although the invention has been and will be described hereinbefore and hereinafter with regard to a horizontal bandsaw machine in which the cutting head assembly 7 carrying the endless bandsaw blade 23 is swung up and down around the hinge shaft 9. For example, the present invention is applicable to horizontal bandsaw machines in which a cutting head assembly is vertically raised and lowered in its entirety along a single or plural vertical guide means and also to hacksawing machines in which a straight blade is reciprocated.

Figure 2:
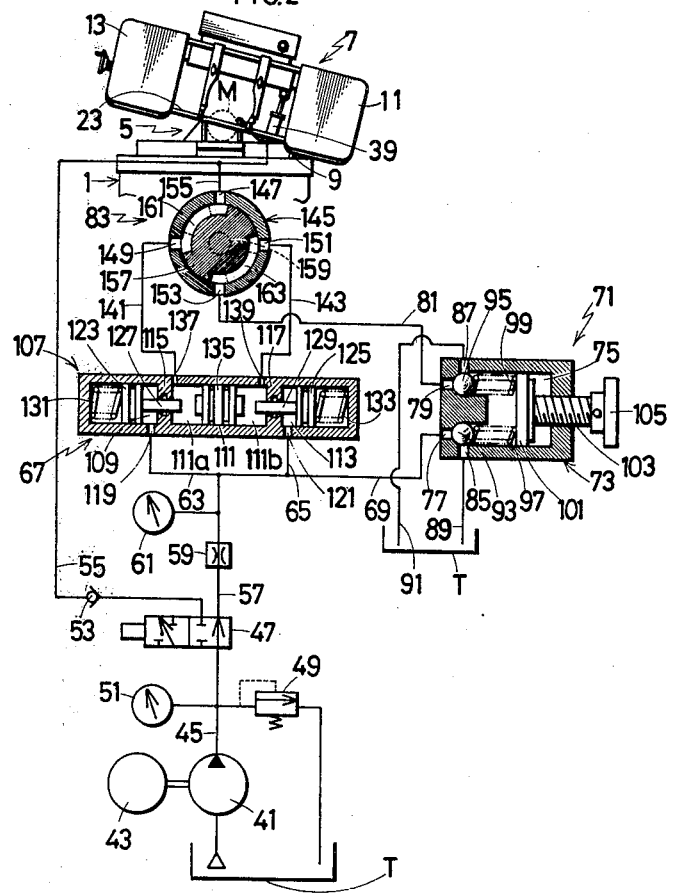
FIG. 2 is a diagrammatic view of the feed control system of the horizontal bandsaw machine shown in FIG. 1.

Referring to FIG. 2, there is shown a hydraulic control system for raising and lowering the cutting head assembly 7. The cutting head assembly 7 is raised when hydraulic cylinder 39 is supplied with the hydraulic fluid from a hydraulic tank T by a pump 41 which is driven by a motor 43. Also, the cutting head assembly 7 is lowered to feed the bandsaw blade 23 into the material M when hydraulic fluid is discharged from cylinder 39 and is returned to the hydraulic tank T.

According to the present invention, hydraulic fluid is always fed by pump 41 from hydraulic tank T through a conduit 45 and a solenoid operated valve 47 whenever the cutting head assembly 7 is raised or lowered. The conduit 45 also communicates with a relief valve 49 and a pressure gauge 51. The solenoid operated valve 47, which is the two position type. When energized, the valve 47 directs hydraulic fluid to the hydraulic cylinder 39 via a check valve 53 and a conduit 55 to raise the cutting head assembly 7. When the cutting head assembly 7 is to be lowered, the solenoid operated valve 47 is de-energized to direct hydraulic fluid to a conduit 57 which is provided with a flow control valve 59 and a pressure gauge 61.

The conduit 57 leads to a conduit 69 having branch conduits 63 and 65 connected to a flow control valve assembly 67. Conduit 69 continues on to a pressure control valve assembly 71 of a special construction. The flow control valve assembly 67 will be described hereinafter in great detail, but it is of a kind of plunger pump which pumps out the hydraulic fluid drained thereto from hydraulic cylinder 39 in response to the pressure of the hydraulic fluid prevailing in conduits 63 and 65.

The pressure control valve assembly 71 has a housing 73 forming an interior chamber 75 which may be cylindrical in shape. The housing 73 of the pressure control valve assembly 71 is provided at one end with a pair of inlet ports 77, 79 communicating internally with chamber 75. The inlet port 77 is connected exteriorly to conduit 69, while inlet port 79 is connected exteriorly to cylinder 39 by means including a conduit 81 and a rotary valve assembly 83 which will be described hereinafter in greater detail. Housing 73 is further provided with a pair of outlet ports 85, 87 which are so arranged as to communicate internally with the inner open ends of the inlet ports 77, 79, respectively, substantially at right angles therewith. The outlet ports 85, 87 communicate externally with drain conduits 89, 91, respectively, through which hydraulic fluid is returned to the hydraulic tank T. Thus, hydraulic fluid coming from conduits 69, 81 go into the inlet ports 77 and 79 and are drained through the outlet ports 77 and 79 and the drain conduits 89 and 91 to the hydraulic tank T.

In order to control the hydraulic pressures in the conduits 69, 81 and their upstream portions, the pressure control valve assembly 71 is provided with a pair of ball valve members 93, 95 which are engaged with the open junctions between the outlet and inlet ports 77, 85 and between the inlet and outlet ports 79, 87, respectively. The ball valve members are kept in engagement with said junctions by a pair of springs 97, 99, respectively. The springs 97, 99 are biased to the ball valve members 93, 95 by a spring holder 101 which is adjustably movable in the chamber cavity 75. For the purpose of the adjustment, the spring holder 101 is provided at its back opposite to the springs 97, 99 with an adjusting screw 103 which is threaded through the housing 73 and provided externally with an adjusting knob 105.

From the above description, it will be understood that the biasing forces of the springs 97, 99 on the ball valve members 93, 95, respectively, are simultaneously adjusted when the adjusting knob 105 is rotated in either direction. Accordingly, the hydraulic fluid pressures in conduits 69, 81 and their upstream portions can be simultaneously controlled. As will be described hereinafter in great detail, the adjusting knob 105 is tightened to increase the pressures when the bandsaw blade 23 is to cut normal materials which are generally soft and brittle. By the same token, the adjusting knob 105 is loosened to reduce the pressures when the bandsaw blade 23 is cutting difficult materials which are generally hard and tough. Also, as will be understood as the description proceeds, the hydraulic fluid pressure in conduit 81 is equal to that in the hydraulic cylinder 39, since the passage 81 is connected with the hydraulic cylinder 39. Accordingly, the hydraulic pressure in the hydraulic cylinder 39 is controlled when the knob 105 is adjusted in the pressure control valve assembly 71.

The flow control valve assembly 67, to which the divergent conduits 63, 65 are connected has a somewhat elongated housing 107 which may be cylindrical in shape. The housing 107 is partitioned interiorly by walls 115, 117 to form three chambers 109, 111 and 113.

The end-most chambers 109, 113 are identical and are formed with ports 119 and 121, respectively, to which the divergent conduits 63 and 65 are connected, respectively. The chambers 109, 113 contain a pair of piston members 123, 125, respectively, which are provided at their central portions with projecting piston rods 127, 129, respectively. The rods 127, 129 slidably extend through bores formed through the walls 115, 117, respectively, so as to project into the central chamber 111. The piston members 123 and 125 are biased toward the central chamber 111 by springs 131, 133, respectively, which are contained in the side chambers 109, 113, respectively. Thus, when pressurized hydraulic fluid is fed into the side chambers 109, 113 from the conduits 63, 65, the piston members 123, 125 are moved against the springs 131, 133 to retract their projecting rods 127, 129 from the central chamber 111. Also, it will be readily apparent that the projecting rods 127, 129 are oppositely displaced into and out of the central chamber 111 according to the pressure of the hydraulic fluid which is controlled by the pressure control valve assembly 71.

The central chamber 111 of the flow control valve assembly 67 is provided with a plunger member 135 slidably contained therein, and which further divides the chamber 111 into two sub-chambers 111a, 111b. The sub-chambers 111a, 111b are formed with ports 137, 139, respectively, which are connected with the rotary valve assembly 83 through conduits 141 and 143, respectively. Thus, when either of the sub-chambers 111a, 111b is supplied with pressurized hydraulic fluid from the rotary valve assembly 83, the plunger member 135 is moved in the central chamber 111 a distance or stroke defined by the projecting rods 127, 129 of the piston members 123, 125.

The rotary valve assembly 83 has a housing 145 which is cylindrical or disk-like in shape, and which is formed with an inlet port 147, ports 149, 151 which may be termed two-way ports, and an outlet port 153, all of which are angularly equally spaced from one another. The inlet port 147 is connected with the hydraulic cylinder 39 through a conduit 155, which may be connected with the cylinder 39 directly or through the upstream portion of the conduit 55 beyond the check valve 53. The two-way ports 149, 151 are connected with ports 137, 139, respectively, of the flow control valve assembly 67 through conduits 141, 143, respectively, while outlet port 153 is connected to the port 79 of the pressure control valve assembly 71 through the conduit 81.

Housing 145 of valve assembly 83 contains a rotary valve member 157 which may be cylindrical or disk-like in shape. The rotary valve member 157 is provided with a rotary shaft 159 and is so designed as to be rotated in the housing 145 with the rotation of the driving wheel 15 in any suitable manner. Also, the rotary valve member 157 is formed at its periphery with a pair of elongate grooves or notches 161, 163 which are diametrically opposite or symmetrical to each other. Each of the grooves 161, 163 of the rotary valve member 157 is so formed in length and position so as to connect two angularly adjacent ports 147, 149, 151 and 153. Thus, when the rotary valve member 157 is at its rotational position in the housing 145 as shown in FIG. 2 by the continuous lines, the groove 161 is connecting the inlet port 147 and the two-way port 149 while the other groove 163 is connecting the two-way port 151 with the outlet port 153. Also, when the rotary valve member 157 is at its rotational position as shown by the discontinuous lines in FIG. 2, the inlet port 147 is connected with the two-way port 151 while the two-way port 149 is connected with the outlet port 153. Accordingly, when the rotary valve member 157 is rotated in the housing 145, the inlet port 147 and the outlet port 153 are alternately connected with either of the two-way ports 149, 151 which are connected with the central sub-chambers 111a and 111b, respectively, of the flow control valve assembly 67 through the conduits 141 and 143, respectively.

In this connection, it will be readily understood that the rotary valve member 157 of the rotary valve assembly 83 is rotated at speeds in proportion to the speeds at which the bandsaw blade 23 is operated, since it is rotated with the rotation of the driving wheel 15. Accordingly, the rotary valve member 157 is rotated at higher speeds in cutting normal materials and at lower speeds in cutting difficult materials.

As will be now understood, the hydraulic fluid which has been supplied to the hydraulic cylinder 39 to raise the cutting head assembly 7 is discharged therefrom into the rotary valve assembly 83 through the conduit 155 when the cutting head assembly 7 is to be lowered to feed the bandsaw blade 23 into the material M. Since the rotary valve member 157 of the rotary valve assembly 83 is being rotated with the rotation of the driving wheel 15, the hydraulic fluid from the hydraulic cylinder 39 is led from the inlet port 147 alternately to either of the two-way ports 149 and 151. Thus, with the rotation of the rotary valve member 157, the hydraulic fluid coming from the hydraulic cylinder 39 is alternately fed into either of the central sub-chambers 111a and 111b of the flow control valve assembly 67 through the conduits 141 and 143.

The hydraulic fluid coming from the hydraulic cylinder 39 through the rotary valve assembly 83 is pressurized by the weight of the cutting head assembly 7 and therefore it is urged to move the plunger member 135 of the flow control valve assembly 67 when fed into either of the central sub-chambers 111a and 111b thereof. When the hydraulic fluid is urged in either of the central sub-chambers 111a and 111b to move the plunger member 135, the hydraulic fluid having entered into the other of the central sub-chambers 111a and 111b is exhausted therefrom by the plunger member 135 to return to the rotary valve assembly 83 via either of the conduits 141, 143. The hydraulic fluid exhausted from either of the central sub-chambers 111a, 111b flows into the rotary valve assembly 83 from either of the two-way ports 149, 151, and then passes through either of the grooves 161, 163 to exit through outlet port 153, and then on through conduit 81 to the pressure control valve assembly 71. Thus, the hydraulic fluid exhausted from the flow control valve assembly 67 is drained to the hydraulic tank T through the pressure control valve assembly 71 and the drain conduit 91 when it overcomes the spring pressure 99 of the pressure control valve assembly 71.

From the above description, it will now be understood that the hydraulic fluid exhausted from the hydraulic cylinder 39 is alternately led into the central sub-chambers 111a, 111b of the flow control valve assembly 67 and is fed out therefrom by the plunger member 135 to be returned to the hydraulic tank T through the pressure control valve assembly 71. Accordingly, the amount of the hydraulic fluid exhausted from the hydraulic cylinder 39 can be controlled by adjusting the stroking length of the plunger member 135, as far as the pressure control valve assembly 71 allows the hydraulic fluid to flow therethrough. As has been described hereinbefore, the stroking length of the plunger member 135 is defined by the distance between the ends of the projecting rods 127 and 129 of the piston members 123 and 125. Also, the distance between the projecting rods 127 and 129 is determined by the pressure of the hydraulic fluid which is prevailing in the conduits 63, 65 and 69 to act on the piston members 123 and 125 and is controlled by the pressure control valve assembly 71. Thus, when the pressure control valve assembly 71 is set to reduce the hydraulic pressure in the conduits 63, 65 and 69 by loosening the adjusting knob 105 thereof, the projecting rods 127 and 129 will project further into the sub-chambers 111a, 111b, so as to shorten the stroke of the plunger member 135, thereby reducing the amount of hydraulic fluid being pumped back out through conduits 141, 143. To the contrary, when the pressure control valve assembly 71 is set to increase the hydraulic pressure in conduits 63, 65 and 67 by tightening the adjusting knob 105, the opposite result will be achived.

It will be understood that the pressure control valve assembly 71 is so designed as to also control the hydraulic pressure prevailing throughout from the hydraulic cylinder 39 to the conduit 81. Accordingly, the hydraulic fluid can be exhausted from the hydraulic cylinder 39 to the hydraulic tank T (through the pressure control valve assembly 71) so that it may be always kept at a pressure set by the pressure control valve assembly 71. Thus, when the pressure control valve assembly 71 is so set as to keep the hydraulic fluid at a higher pressure, less hydraulic fluid is returned to the hydraulic tank T, even if the stroke of the plunger member 135 is increased. However, when the pressure control valve assembly 71 is set to keep the hydraulic fluid at a lower pressure, the hydraulic fluid is exhausted to the hydraulic tank T at a rate at which the plunger member strokes or works.

From the above description, it will now be understood that the hydraulic fluid is exhausted from the hydraulic cylinder 39 to the hydraulic tank T at a rate controlled by both the pressure control valve assembly 71 and the flow control valve assembly 67. When the pressure control valve assembly 71 is so set as to keep the pressure higher by tightening the adjusting knob 105 of the pressure control valve assembly 71, the flow rate of hydraulic fluid being exhausted from the hydraulic cylinder 39 is much more under the pressure control. To the contrary, when the control valve assembly 71 is set to keep the hydraulic pressure lower by loosening the adjusting knob 105, the flow rate of the hydraulic fluid being exhausted from the hydraulic cylinder 39 is much more under the control of the flow control valve assembly 67. As has been described hereinbefore, the adjusting knob 105 is tightened in cutting normal easy-to-cut materials and it is loosened in cutting difficult materials. Thus, when cutting normal easy-to-cut materials, the hydraulic fluid is discharged from the hydraulic cylinder 39 to feed the bandsaw blade 23 under the pressure control by valve assembly 71. However, when cutting difficult materials, the hydraulic fluid is exhausted from the hydraulic cylinder 39 mainly under the flow control by the flow control valve assembly 67.

In a cutting operation with the horizontal bandsaw machine shown in FIG. 2 according to the present invention, the solenoid operated valve 47 is firstly energized to enable the pump 41 to supply the hydraulic fluid from the hydraulic tank T into the hydraulic cylinder 39. Thus, the cutting head assembly 7 is pivotally raised by the piston rod 37 of the hydraulic cylinder 39 around the hinge shaft 9. Then, the solenoid operated valve 47 is de-energized to enable the hydraulic fluid to flow from the hydraulic tank T towards the pressure control valve 71 through the passage 37, the flow control valve 59 and passage 69. As the result, the hydraulic pressure set by the pressure control valve 71 will act on the piston members 123, 125 of the flow control valve assembly 67 from the branch conduits 63, 65 to enable the projecting rods 127 and 129 to define the stroke of the plunger member 135. Then, the cutting head assembly 7 is lowered to feed the bandsaw blade 23 into the material M to be cut when the hydraulic fluid is exhausted from the hydraulic cylinder 39 to the hydraulic tank T through the rotary valve assembly 83, the flow control valve assembly 67 and again the rotary valve assembly 83 and then the pressure control valve assembly 71.

Assuming that the material M to be cut is easy to cut, the pressure control valve assembly 71 is so set as to keep the hydraulic pressure higher by tightening the adjusting knob 105 and the bandsaw blade 23 is operated at a higher speed for economical and efficient cutting. Accordingly, the hydraulic fluid is exhausted from the hydraulic cylinder 39 only to be kept at the pressure set by the pressure control valve assembly 71, although the rotary valve member 157 of the rotary valve assembly 83 is rotating faster with the rotation of the driving wheel 15 and the plunger member 135 of the flow control valve assembly 67 has a tendency to largely stroke. In other words, the hydraulic fluid in the hydraulic cylinder 39 is always kept at the pressure set by the pressure control valve assembly 71 and is kept holding the cutting head assembly 7 with the fixed pressure set by the pressure control valve assembly 71 while exhausting from the hydraulic cylinder 39. This means that the amount of hydraulic fluid which is exhausted from the hydraulic cylinder 39 to the hydraulic tank T is determined by the actual pressure produced in the hydraulic cylinder 39. Thus, when the hydraulic pressure in the hydraulic cylinder 39 is greatly increased, a larger amount of the hydraulic fluid is exhausted from the hydraulic cylinder 39 to the hydraulic tank T. To the contrary, when the hydraulic pressure in the hydraulic cylinder 39 is reduced, the amount of the hydraulic fluid exhausting from the hydraulic cylinder 39 to the hydraulic tank T is correspondingly reduced.

As will be readily understood, the hydraulic pressure in the hydraulic cylinder 39 is produced by the gravity of the cutting head assembly 7 which urges downwardly the piston rod 37 of the hydraulic cylinder 39. However, the actual gravity of the cutting head assembly 7 acting onto the piston rod 37 is changed as the cutting reaction acting upwardly onto the bandsaw blade 23 is changed. Also, the cutting reaction against the bandsaw blade 23 is increased as the cross section of the material M to be cut is increased. Thus, when and as the cross section of the material M being cut is increased to increase the cutting reaction upwardly acting onto the bandsaw blade 23, the actual weight urging downwardly onto the piston rod 37 is reduced and the hydraulic pressure in the hydraulic cylinder 39 is also reduced. Accordingly, when and as the cross section of the material M being cut is increased, the hydraulic fluid exhausted from the hydraulic cylinder to the hydraulic tank T is correspondingly reduced and as a result the cutting head assembly 7 is correspondingly more slowly lowered. This means that the cutting rate which is defined as square millimeters of cut per unit of time is maintained uniform when the hydraulic fluid is exhausted from the hydraulic cylinder 39 under the pressure control by the pressure control valve assembly 71. Thus, the bandsaw blade 23 is fed into the material M to be cut at the uniform cutting rate without being forced to work too hard when cutting easy-to-cut materials at a higher travelling speed thereof.

The adjusting knob 105 of the pressure control valve assembly 71 is loosened to reduce the hydraulic pressure when the material M to be cut is hard and tough and therefore is difficult to cut. Also, the driving wheel for driving the bandsaw blade 23 is rotated at a lower speed to enable the bandsaw blade 23 to duly cut into the hard and tough material to be cut without overwork. When the adjusting knob 105 is loosened, the pressure control valve will lower the hydraulic fluid pressure in the hydraulic cylinder 39, and thus allow the hydraulic fluid to almost freely flow therethrough to the hydraulic tank T.

Accordingly the gravity of the cutting head assembly 7 fully acts onto the bandsaw blade 23 to enable the same to cut hard and tough material M. Also the hydraulic fluid is exhausted from the hydraulic cylinder 39 fully by an amount which the plunger member 135 extrudes in the flow control valve assembly 67 as the rotary valve member 157 is rotated in the rotary valve assembly 83. Thus, when the material M to be cut is difficult to cut the cutting head assembly 71 is lowered by its entire gravity to duly feed the bandsaw blade 23 into the material M by controlling the flow of the hydraulic fluid exhausted from the hydraulic cylinder 39 by the flow control valve assembly 67.

As is readily apparent, the flow of the hydraulic fluid exhausted from the hydraulic cylinder 39 is controlled to cut difficult-to-cut materials by adjusting the stroking length of the plunger member 135 which is defined by the projecting rods 127 and 129 in the flow control valve assembly 67.

As has been described hereinbefore, the stroking length of the plunger member 135 is increased and reduced according to the hydraulic pressure acting on the piston members 123, 125 of the flow control valve assembly 67. Thus, when it is desired to discharge much more of the hydraulic fluid from the hydraulic cylinder 39 to more slowly lower the cutting head assembly 7, the adjusting knob 105 of the pressure control valve assembly 71 is further loosened to further reduce the hydraulic pressure. Accordingly, the feeding speed of the bandsaw blade 23 in cutting difficult-to-cut materials can be adjusted by adjusting the adjusting knob 105 of the pressure control valve assembly 71.

As is now readily apparent from the above description, the feeding of the bandsaw blade 23 according to the present invention can be easily controlled steplessly according to the materials to be cut only by adjusting the adjusting knob 105 of the pressure control valve assembly 71. When the adjusting knob 105 is tightened, the bandsaw blade 23 is fed into the material M under the pressure control which is suitable to cut easy-to-cut materials. Also, when the adjusting knob 105 is loosened the bandsaw blade 23 is fed into the material M under the flow control which is recommended when cutting difficult-to-cut materials. Furthermore, it will be understood that the bandsaw blade 23 can be fed into the material M under both of the pressure control and the flow control when the adjusting knob 105 is adjusted midway.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. In a horizontal bandsaw machine having a cutting blade operable at variable speeds, said cutting blade being carried on a head assembly which is movably mounted relative to a table for supporting the material to be cut, said head assembly being movable away from said table by means of a fluid-actuated mechanism which is fed with hydraulic fluid drawn by a pump from a fluid reservoir, said head assembly being movable towards said table by means of gravity at a rate controlled by the return flow of hydraulic fluid from said fluid-actuated mechanism to said fluid reservoir, the improvement comprising: first conduit means for connecting said pump to said fluid-actuated mechanism; second conduit means for connecting said fluid-actuated mechanism to said fluid reservoir; valve means in said second conduit means for controlling the rate of return fluid flow therethrough from said fluid-actuated mechanism to said fluid reservoir, said valve means being responsive to both the operating speed of said cutting blade and to the fluid pressure in said second conduit means; and, manually adjustable pressure control means in said second conduit means for varying said fluid pressure.

2. The apparatus of claim 1 wherein said valve means includes a rotary valve assembly having a housing; an inlet port through which a return flow of hydraulic fluid is admitted into said housing from said fluid-actuated mechanism; an outlet port through which a return flow of hydraulic fluid is discharged from said housing to said fluid reservoir; a pair of two-way ports for accommodating flow of hydraulic fluid into and out of said housing, said two-way ports being interconnected externally of said housing by a flow control valve assembly forming part of said valve means and by sections of said second conduit means; and a rotatable valve member in said housing for alternately connecting said inlet and outlet ports with each of said two-way ports, said valve member being rotatable at a speed which is proportional to the operating speed of said cutting blade.

3. The apparatus of claim 2 wherein said control valve assembly includes a second housing subdivided by a reciprocal valve member, a two-way port on either side of said reciprocal valve member through which hydraulic fluid may enter and exit from said second housing, each two-way port of said second housing being connected to a two-way port of said first-mentioned housing by said sections of said second conduit means.

4. The apparatus of claim 3 further comprising means responsive to fluid pressure from said pump for controlling the movement of said reciprocal valve member, said means being connected to said pump by third conduit means.

5. The apparatus of claim 4 wherein the fluid pressure in said third conduit means is controlled by said manually adjustable pressure control means.

6. The apparatus as claimed in claims 4 or 5 further comprising a solenoid operated valve means for alternately connecting said pump to either said first conduit means or said third conduit means.

* * * * *